United States Patent [19]

Sugiyama et al.

[11] Patent Number: 5,350,031
[45] Date of Patent: Sep. 27, 1994

[54] PLURAL GENERATOR APPARATUS FOR AN ELECTRIC HYBRID AUTOMOBILE

[75] Inventors: Takeshi Sugiyama; Yutaka Kitamura, both of Himeji, Japan

[73] Assignee: Mitsubishi Denki Kabushiki Kaisha, Tokyo, Japan

[21] Appl. No.: 79,923

[22] Filed: Jun. 23, 1993

[30] Foreign Application Priority Data

Jul. 7, 1992 [JP] Japan .................................. 204359

[51] Int. Cl.$^5$ ............................................... B60K 1/02
[52] U.S. Cl. ................................................. 180/65.4
[58] Field of Search ................... 180/65.1; 322/44, 45, 322/25

[56] References Cited

U.S. PATENT DOCUMENTS 4,959,577 9/1990 Radomski ............................ 310/263
5,099,189 3/1992 Iwaki et al. ............................ 322/25

FOREIGN PATENT DOCUMENTS 0394481 10/1990 European Pat. Off. ..
429504 4/1992 Japan .
295252 8/1928 United Kingdom .
1288587 9/1972 United Kingdom .
1312699 4/1973 United Kingdom .

Primary Examiner—Richard Camby
Attorney, Agent, or Firm—Sughrue, Mion, Zinn, Macpeak and Seas

[57] ABSTRACT

A power generation apparatus for an electric hybrid automobile. Two a.c. generators 21, 22 which have different rotation speeds at the initiation of power generation and which provide high efficiency at or near the different rotation speeds are driven by an internal combustion engine 1 via a belt 23. An a.c. power is supplied to a rectifier 4, and the power is used as a power source for an induction motor 7 and a battery 5.

2 Claims, 3 Drawing Sheets

PLURAL GENERATOR APPARATUS FOR AN ELECTRIC HYBRID AUTOMOBILE

BACKGROUND OF THE INVENTION

The present invention relates to a power generation apparatus for an electric hybrid automobile having a.c. generators which are driven by an internal combustion engine and serve as a power source for an induction motor for cruising.

FIG. 3 is a diagram showing a conventional power generation and moving mechanism of an electric hybrid automobile provided with a power generation apparatus. In FIG. 3, reference numeral 1 designates an internal combustion engine, numeral 2 designates an a.c. generator driven by the internal combustion engine 2 through a belt-connection means 3 at a rotation speed of three times as fast as a rotation speed of the engine, numeral 4 designates a rectifier for rectifying an a.c. voltage of the a.c. generator 2 into a d.c. voltage, numeral 5 designates a battery as an auxiliary d.c. power source, which is charged with an output voltage of the rectifier 4, and numeral 6 designates a control device which controls an exciting current in the a.c. generator by means of a voltage regulator by detecting an output voltage of the rectifier 4 to thereby effect voltage regulation, and converts a d.c. voltage from the rectifier 4 into an a.c. voltage by means of a stationary type inverter. The control device 6 also changes the frequency of the a.c. voltage. Numeral 7 designates an induction motor which receives the a.c. voltage under the control of the control device 6. The rotation speed of the induction motor is controlled by the change of the frequency of the a.c. voltage by the control device 6. Numeral 8 designates a differential gear to which the rotational force of the induction motor 7 is transmitted. The differential gear 8 rotates the wheels 10 through an axle 9.

The internal combustion engine has an operating zone at or near 3,000 rpm as a rated engine speed which provides the most effective fuel consumption efficiency. In that operating zone, the operation for a substantially constant rotation speed is conducted. The internal combustion engine 1 has another operating zone at or near 4,000 rpm which is used when the maximum speed or the maximum acceleration is necessary for the automobile, and another operating zone in a range of 1,000 to 1,500 rpm when the automobile is operated with the battery 5 fully charged, or when the automobile is stopped for a long time. Accordingly, for the a.c. generator 2 used for a conventional automobile, there is a requirement that the output current characteristics corresponding to the engine rotation speed should satisfy values at three points $I_1$, $I_2$ and $I_3$ of an output current from of the rectifier which are indicated by X marks in FIG. 4. In order to satisfy the above-mentioned output current characteristics, the size of the a.c. generator 2 is necessarily large. The output voltage of the rectifier 4 is, for instance, 280 V and the voltage of the battery 5 is, for instance, 240 V.

The conventional power generation apparatus for an electric hybrid automobile has the following disadvantages. Since the single a.c. generator 2 to be driven has to bear the supply of power so as to cover a rotation speed range from a rotation speed the idling of the combustion engine 1 to a rotation speed which corresponds to the maximum power of the automobile, the size of the generator 2 is necessarily large, and the efficiency of the operation of the engine is low at the rated engine speed at which a high efficiency is necessary (usually, the operation of the engine at the rated engine speed is most frequently used). Further, there is difficulty in mounting and arranging the large-sized generator 2 on the internal combustion engine 1. Further, since the size of the generator 2 is large, a fairly large-sized belt connection means 3 which connects the a.c. generator 2 to the internal combustion engine 1 is required.

SUMMARY OF THE INVENTION

It is an object of the present invention to provide a power generation apparatus for an electric hybrid automobile which provides a power generation characteristics suited for the characteristics required for the internal combustion engine of the electric hybrid automobile, has a small size, and allows highly efficient operations.

It is another object of the present invention to provide a power generation apparatus for an electric hybrid automobile which facilitates mounting on an internal combustion engine and reduces the size of a driving force transmitting means for generators.

In accordance with the present invention, there is provided a power generation apparatus for an electric hybrid automobile comprising:
  an a.c. generator driven by an internal combustion engine through a rotation transmitting means,
  a rectifier for rectifying an a.c. voltage of the a.c. generator,
  a battery charged with an output from the rectifier,
  a control device which is supplied with a d.c. voltage from the rectifier or the battery, and converts the d.c. voltage into an a.c. voltage with a change of frequency by means of a stationary type inverter, and
  an induction motor which is supplied with an a.c. power by the control device to drive an automobile,
  the power generation apparatus being characterized in that a plurality of a.c. generators are provided, and they have different rotation speeds at the initiation of generation of power.

DETAILED DESCRIPTION OF THE PREFERRED EMBODIMENTS

Preferred embodiments of the present invention will be described with reference to FIGS. 1 and 2.

Figure 1:
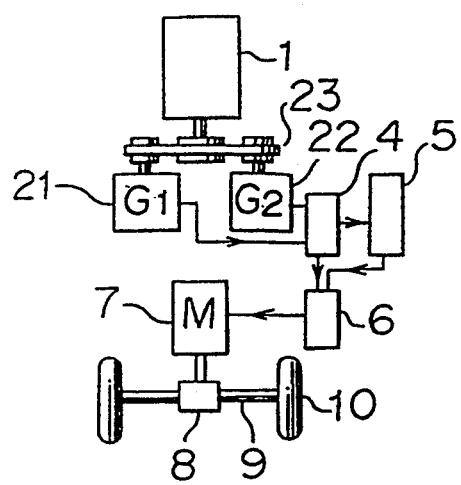
FIG. 1 is a diagram of an electric hybrid automobile provided with a power generation apparatus according to a first embodiment of the present invention.
Figure 3:
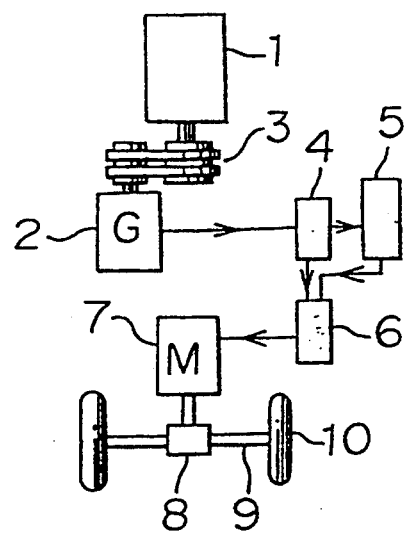
FIG. 3 is a diagram showing a conventional electric hybrid automobile provided with a power generation apparatus and auxiliary means.
Figure 4:
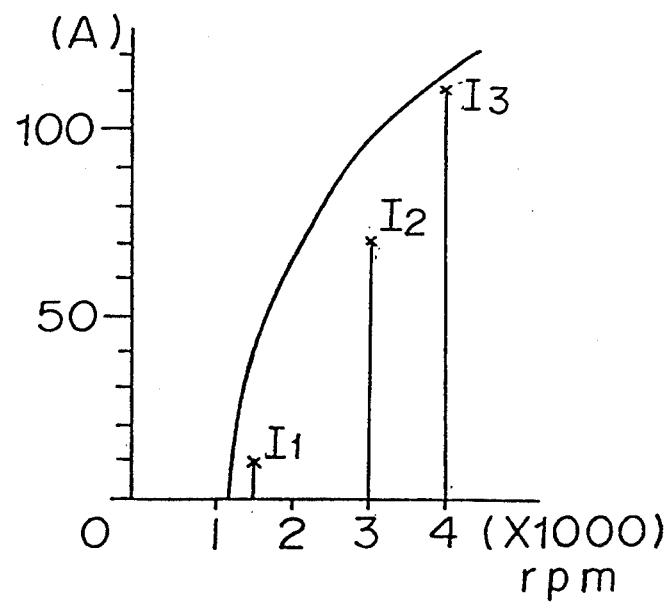
FIG. 4 is a characteristic curve of the conventional a.c. generator in FIG. 3 wherein the output current characteristic vs. the engine rotation speed is shown as an output current of a rectifier.

FIG. 1 is a diagram showing an electric hybrid automobile provided with a power generation apparatus and auxiliary means according to the first embodiment of the present invention. In FIG. 1, reference numerals 1 and 4 through 10 designate the same elements as in FIG. 3.

Numeral 21 designates a first a.c. generator which has a low rotation speed at the initiation of power generation and which shows high efficiency in a low rotation speed region. The first a.c. generator has a small capacity and a small size in comparison with the conventional generator described with reference to FIG. 3.

Numeral 22 designates a second a.c. generator which has a high rotation speed at initiation of generation of power and which shows high efficiency in a high rotation speed region. The second a.c. generator also has a small capacity and a small size in comparison with the conventional generator.

The first and second a.c. generators 21, 22 are connected to the internal combustion engine 1 by means of a common rotation transmitting means 23 such as a belt connection means so that power generated in both generators is supplied to the rectifier 4. The size of the rotation transmitting means 23 can be reduced since it transmits a rotating force of the internal combustion engine 1 to the small-sized a.c. generators 21, 22. The rotation speed of the generators 21, 22 is increased to, for instance, three times by means of the rotation transmitting means 23.

Figures 2A, 2B:
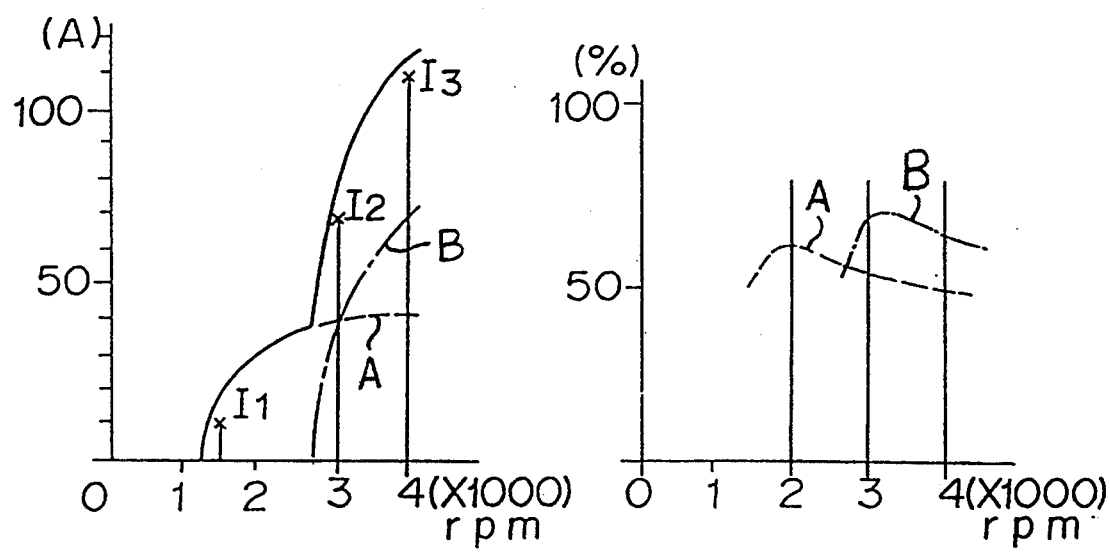
FIG. 2A is a characteristic curve of the power generation apparatus shown in FIG. 1 wherein the output current characteristic vs. the engine rotation speed of the power generation apparatus is shown as an output current of a rectifier.
FIG. 2B is a diagram showing the efficiency of each of a.c. generators, in FIG. 1, vs. the engine rotation speed.

FIG. 2A shows the output current characteristics of the a.c. generators 21, 22 vs. the engine rotation speed in terms of the output current of the rectifier, wherein a broken line indicates the characteristic curve A obtained by the first a.c. generator 21 and a one-dotted chain line indicates the characteristic curve B obtained by the second a.c. generator 22. A solid line shows the total or combined output current of the first and second a.c. generators 21, 22. The solid line passes near the three points $I_1$, $I_2$ and $I_3$ and covers satisfactorily these three points. Accordingly, the first and second a.c. generators do not excessively generate power, they can be of a small capacity.

With the a.c. generators 21, 22, the output voltage of the rectifier 4 is, for instance, 280 V. The first a.c. generator 21 having the characteristic A initiates the generation of power at a rotation speed of 1,500 rpm or lower (such as 1,200 rpm). The second a.c. generator 22 having the characteristic B initiates the generation of power at a rotation speed of 3,000 rpm or lower (such as 2,700 rpm).

FIG. 2B shows characteristic curves showing the efficiency of each of the a.c. generators 21, 22 vs. engine rotation speeds wherein the characteristic A indicates the efficiency of the a.c. generator 21 and the characteristic B indicates the efficiency of the a.c. generator 22.

Generally, a non-load voltage per phase is expressed by $E = K\Phi Zf$ wherein K is a constant, $\Phi$ is the number of magnetic fluxes per pole, Z is the number of series winding conductors per phase, f is frequency ($f = (P/2) \times (N/60)$), P is the number of poles and N is rotation speed.

In the characteristic A of the first a.c. generator having a low rotation speed at the initiation of power generation, f is small while Z is large. On the other hand, in the characteristic B having a high rotation speed at the initiation of power generation, f is large while Z is small. When the value of Z is large, the resistance of the stator coil is large whereby copper loss is large and the efficiency is reduced. Further, armature reaction due to a magnetic field which is produced by the passing of an armature current is large, and the output is reduced to thereby reduce the efficiency. Accordingly, in the first a.c. generator 21 having a large value of Z and a low rotation speed at the initiation of power generation, the efficiency is reduced in a high rotation speed region whereby it shows the characteristic curve A in FIG. 2B. On the other hand, in the second a.c. generator 22 having a small value of Z and a high rotation speed at the initiation of power generation, the efficiency is high in a high rotation speed region whereby it shows the characteristic curve B in FIG. 2B. In the conventional power generation apparatus, the rotation speed at the initiation of generation of power is the same as the characteristic curve A in FIG. 2B and the efficiency is the same as the characteristic curve A.

In a second embodiment of the present invention, the control voltage for the first a.c. generator 21 having the characteristic curve A is determined to be lower than the control voltage for the second a.c. generator 22 having the characteristic curve B. By determining these control voltages, the second a.c. generator 22 which is more efficient than the first a.c. generator 21 dominantly shares a load in operation at the rated engine speed (such as 3,000 rpm) whereby a further high efficient operation is obtainable.

In the above-mentioned embodiments, two a.c. generators 21, 22 having different rotation speeds at the initiation of power generation are used. However, three or more a.c. generators may also be used.

Figure 5:
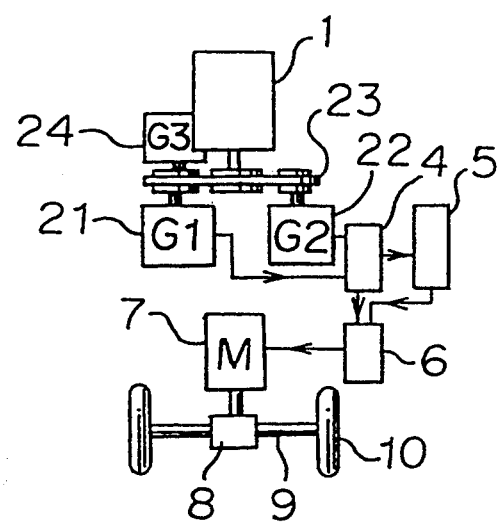
FIG. 5 is a diagram showing another embodiment of the electric hybrid automobile according to the present invention.

FIG. 5 is a diagram showing still another embodiment of the present invention wherein a third a.c. generator 24 is used in addition to the first and second generators 21, 22. The same reference numerals as in FIG. 1 designate the same elements.

Further, in the above-mentioned embodiments, the belt connection means is used as the rotation transmitting means 13 for the generators. However, another rotation transmitting means such as a chain connection means or a gear connection means may be used.

As mentioned above, in accordance with the present invention, a plurality of a.c. generators having different rotation speeds at the initiation of power generation, and providing high efficiency at or near the rotation speeds are connected for supplying power to an internal combustion engine by means of a rotation transmitting means. Accordingly, power generation characteristics suited for the operation characteristic required for the internal combustion engine for an electric hybrid automobile can be obtained; the size of each of the a.c. generators be reduced; flexibility in arranging the a.c. generators be increased; and the size of the rotation transmitting means can be reduced. The power generation apparatus can be driven with the own characteristics of the a.c. generators, and efficiency can be increased because highly efficient operation is obtainable with a large output by the generator providing a high efficiency at or near the rated engine speed. A further highly efficient operation is obtainable by determining a control voltage for the generator having a low rotation speed at the initiation of power generation to be lower than the generator having high rotation speed at the initiation of power generation.

We claim:

1. A power generation apparatus for an electric hybrid automobile, said power generation apparatus comprising:
   a) a plurality of a.c. generators commonly driven in parallel by an internal combustion engine (1) through a rotation transmitting means (23),
   b) a rectifier (4) for rectifying a.c. output voltages of the a.c. generators,
   c) a battery (5) charged with an output from the rectifier,
   d) a control device (6) supplied with a d.c. voltage from the rectifier of the battery, for converting the d.c. voltage into a variable frequency a.c. voltage by means of a stationary inverter, and
   e) an induction motor (7) supplied with a.c. power by the control device for driving an automobile,
   f) one of the a.c. generators having a relatively low rotation speed at the initiation of power generation, and another one of the a.c. generators having a relatively high rotation speed at the initiation of power generation.

2. The power generation apparatus according to claim 1, wherein two a.c. generators are used, and a control voltage applied to the a.c. generator having a relatively low rotation speed at the initiation of power generation is lower than a control voltage applied to the a.c. generator having a relatively high rotation speed at the initiation of power generation.

* * * * *